March 12, 1935. D. E. WRIGHT 1,994,380
COUNTERWEIGHT
Filed Nov. 19, 1927
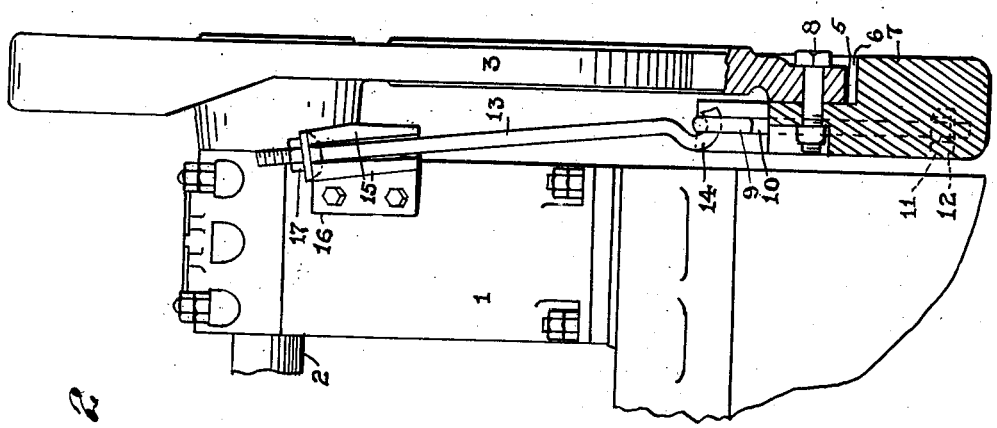
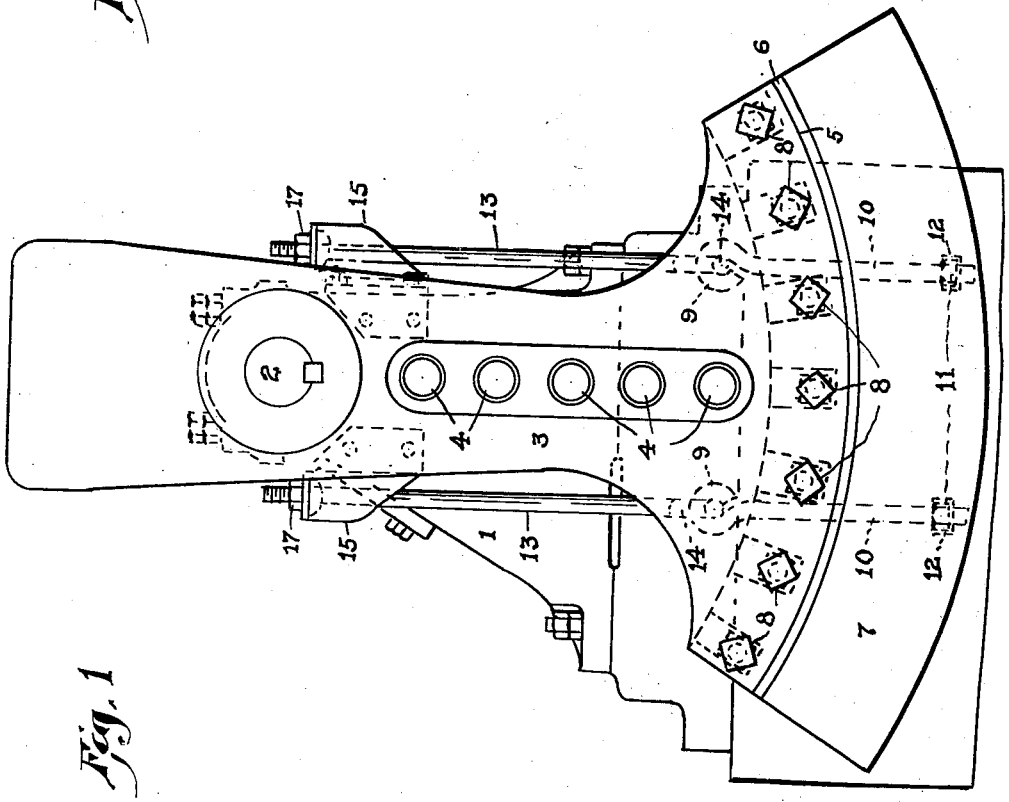
INVENTOR
D. E. Wright
by F. N. Barker
attorney Patented Mar. 12, 1935

1,994,380

UNITED STATES PATENT OFFICE 1,994,380

COUNTERWEIGHT

Dallas E. Wright, Toledo, Ohio, assignor, by mesne assignments, to The National-Superior Company, Toledo, Ohio, a corporation of Ohio Application November 19, 1927, Serial No. 234,325

2 Claims. (Cl. 74—591)

My invention relates to counterweights for general use but is shown applied to the crank of a well pumping rig. Occasionally during operations of pumping a well, it is desirable that the crank which is provided with a counterweight be operated at a higher speed than is required for pumping. In this case, the counterweight is disconnected from the crank. It is the purpose of this invention to provide means whereby the counterweight can be detached from the crank or equivalent element and be suspended on some fixed support convenient for its reassemblage with the crank or other element whereby the shaft carrying the crank or equivalent element may at the same time be relieved from unnecessary friction of the shaft on its bearing.

Referring to the accompanying drawing, Fig. 1 is an end view of a housing and a crank containing one form of my invention, and Fig. 2 is a side elevation of the same, a portion being in vertical section.

On the drawing 1 designates a pedestal or support for the shaft 2 which carries the crank or arm 3 having several holes 4 in any one of which the usual wrist or crank pin (not shown) may be placed.

One end of the crank 3 is made arcuate as shown at 5 and is seated in an arcuate recess 6 in the face of the counterweight 7, which is secured to the crank by several bolts 8.

The counterweight is provided between the crank and the pedestal with the eyebolts 9 at opposite sides of the radius through the shaft and the holes 4. The shanks 10 of the eyebolts are in the counterweight and are held therein by the nuts 11 in recesses 12 in the counterweights. Two rods 13 have hooks 14 which interlock with the eyes of the eyebolt and extend upwardly between the lips or flanges 15 of the supports or ledges 16 secured to opposite sides of the pedestal. The upper ends of the rods 13 are threaded and carry the nuts 17 which have seats on the upper edges of the flanges 15. The flanges are open so that the rods may be inserted between them by lateral movements.

With the parts in the positions shown, it may be supposed that it is desired to detach the counterweight from the crank. The hooks are first inserted into the eyes of the eyebolts and the upper ends of the rods are then placed between the flanges 15 with the nuts 17 above them. The nuts 17 are screwed down on their seats and turned down tight enough merely to take the weight of the counterweight off from the bolts 8, so that the latter may be easily removed after their nuts have been taken off. As soon as the bolts have been freed from their nuts, the counterweight swings away from the crank, resting against the pedestal and hanging on the rods 13.

When it is desired to replace the counterweight, it is only necessary to swing it against the crank and secure it thereto by the bolts 8. When this has been done, the nuts 17 are loosened so that the rods may be swung out from between the lips 15. The rods may then be readily unhooked from the eyebolts 9 and laid aside. The word device used in the claims includes a crank or any known mechanical and functional equivalent thereof.

I claim—

1. The combination of a shaft, a device rotatable therewith, a counterweight, there being alined holes in the said device and counterweight, removable fastening devices in the holes when alined, means attachable to the counterweight for suspending the counterweight, a stationary support for the suspending means to relieve the shaft from friction due to the weight of the counterweight, and means for adjusting the said suspending means whereby the said holes may, while the counterweight is suspended, be alined and the fastening devices can be easily inserted through the alined holes or withdrawn therefrom without appreciable friction of the fastening devices in the said holes.

2. The combination of a shaft, a device rotatable therewith, a counterweight, removable bolts in alined holes in the said device and counterweight for connecting the said device and counterweight together, a fixed support, a nut supported by the support, and a rod having threaded connection with the nut and detachably connected to the counterweight whereby the counterweight may be suspended so as to accurately aline the said holes.

DALLAS E. WRIGHT.

CERTIFICATE OF CORRECTION.

Patent No. 1,994,380.                                              March 12, 1935.

DALLAS E. WRIGHT.

It is hereby certified that the State of Incorporation of the assignee in the above numbered patent was erroneously given as "Ohio" whereas said State should have been given as Delaware, as shown by the record of assignments in this office; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.